(12) United States Patent
Traylor

(10) Patent No.: US 11,269,633 B1
(45) Date of Patent: Mar. 8, 2022

(54) SYSTEM AND METHOD FOR EXECUTING A NUMBER OF NOP INSTRUCTIONS AFTER A REPEATED INSTRUCTION

(71) Applicant: NXP B.V., Eindhoven (NL)

(72) Inventor: Kevin Bruce Traylor, Leander, TX (US)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/303,746

(22) Filed: Jun. 7, 2021

(51) Int. Cl.
*G06F 9/30* (2018.01)
*G06F 9/38* (2018.01)

(52) U.S. Cl.
CPC ........ *G06F 9/30079* (2013.01); *G06F 9/3867* (2013.01)

(58) Field of Classification Search
CPC ............. G06F 9/30065; G06F 9/30079; G06F 9/3867; G06F 9/30076
See application file for complete search history.

(56) References Cited

U.S. PATENT DOCUMENTS

| | | | | |
|---|---|---|---|---|
| 5,727,194 A | * | 3/1998 | Shridhar | G06F 8/447 712/241 |
| 5,958,044 A | * | 9/1999 | Brown | G06F 9/3869 712/219 |
| 6,799,266 B1 | * | 9/2004 | Stotzer | G06F 9/30156 712/219 |
| 2014/0089641 A1 | * | 3/2014 | Diewald | G06F 9/3814 712/220 |
| 2017/0371655 A1 | * | 12/2017 | Nakagawa | G06F 9/325 |
| 2021/0182065 A1 | * | 6/2021 | Kondo | G06F 9/30076 |

OTHER PUBLICATIONS

Greiner, Dan; "New z/Architecture Instructions that Can Save You Time & Effort"; SHARE 115 Proceedings, Boston, Massachusetts; Aug. 2, 2010.
IBM System/360 Reference Data; Machine Instructions; 1964.

* cited by examiner

*Primary Examiner* — Corey S Faherty
(74) *Attorney, Agent, or Firm* — Daniel D. Hill

(57) ABSTRACT

A method is provided for executing instructions in a pipelined processor. The method includes receiving a plurality of instructions in the pipelined processor. A first instruction of the plurality of instructions has a first bit field for holding a value for indicating how many times execution of the first instruction is repeated. Also, the value is for indicating how many no operation (NOP) instructions follow a last iteration of the repeated first instruction. The number of repeated instructions plus the number of NOP instructions is equal to the number of pipeline stages in the pipelined processor. In another embodiment, a pipelined data processor is provided for executing the repeating instruction.

21 Claims, 6 Drawing Sheets

| N | NUMBER OF INSTRUCTIONS | NUMBER OF NOPS |
|---|---|---|
| 0 | 8 | 0 |
| 1 | 1 | 7 |
| 2 | 2 | 6 |
| 3 | 3 | 5 |
| 4 | 4 | 4 |
| 5 | 5 | 3 |
| 6 | 6 | 2 |
| 7 | 7 | 1 |

| INSTRUCTION STREAM | PIPELINE STAGES | | | | | | | |
|---|---|---|---|---|---|---|---|---|
| | 1 | 2 | 3 | 4 | 5 | 6 | 7 | 8 |
| INST1[0] | INST1[0] | INST1[0] | INST1[0] | INST1[0] | INST1[0] | INST1[0] | INST1[0] | INST1[0] RESULT AVAILABLE |
| INST1[1] | INST1[1] | INST1[1] | INST1[1] | INST1[1] | INST1[1] | INST1[1] | INST1[1] | INST1[1] RESULT AVAILABLE |
| NOP | | | | | | | | |
| NOP | | | | | | | | |
| NOP | | | | | | | | |
| NOP | | | | | | | | |
| NOP | | | | | | | | |
| INST2[0] | INST2[0] | INST2[0] | INST2[0] | INST2[0] | INST2[0] | INST2[0] | INST2[0] | INST2[0] RESULT AVAILABLE |
| INST2[1] | INST2[1] | INST2[1] | INST2[1] | INST2[1] | INST2[1] | INST2[1] | INST2[1] | INST2[1] RESULT AVAILABLE | of Executions of NOPs

| INSTRUCTION MNEMONIC | INSTRUCTION BIT DEFINITION | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| ADD.N | DST_PTR | | | SCR1_PTR | | | SCR2_PTR | | | | N | | | OPCODE | | |

FIG. 4

| N | NUMBER OF INSTRUCTIONS | NUMBER OF NOPS |
|---|---|---|
| 0 | 8 | 0 |
| 1 | 1 | 7 |
| 2 | 2 | 6 |
| 3 | 3 | 5 |
| 4 | 4 | 4 |
| 5 | 5 | 3 |
| 6 | 6 | 2 |
| 7 | 7 | 1 |

FIG. 5

SYSTEM AND METHOD FOR EXECUTING A NUMBER OF NOP INSTRUCTIONS AFTER A REPEATED INSTRUCTION

BACKGROUND

Field

This disclosure relates generally to data processing, and more particularly, to a pipelined data processing system and method for executing instructions in the pipelined data processing system.

Related Art

A pipelined processor executes instructions in a number of stages in an overlapping manner. Pipelining can improve a processor's instruction execution throughput by allowing different instructions to be in different stages of the pipeline at the same time. However, whenever there are data dependencies in two adjacent instructions in an instruction stream, the pipeline may stall until the data dependencies are resolved. Stalling the pipeline reduces processor efficiency and consumes more power. Therefore, what is needed is a way to execute instructions in a pipelined data processing system that reduces the adverse impact of data dependencies.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates a repeating instruction moving through a processor pipeline in accordance with an embodiment.

FIG. 4 illustrates an instruction format for an instruction according to an embodiment.

FIG. 5 illustrates a table of values for N and corresponding repeating/NOP features for the instruction of FIG. 4.

DETAILED DESCRIPTION

Figure 1:
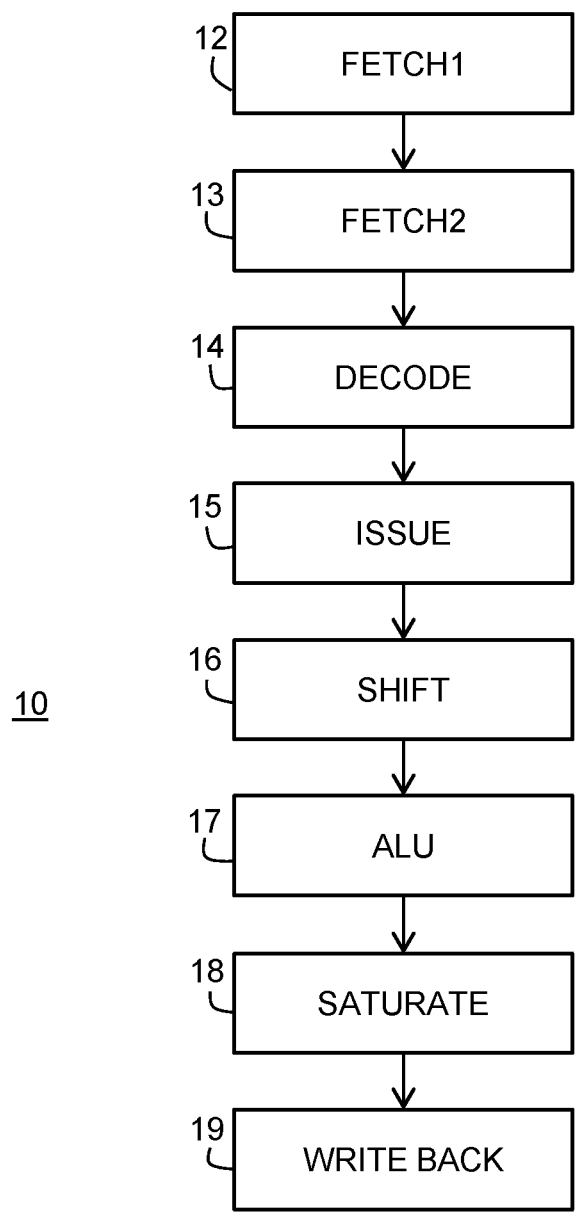
FIG. 1 illustrates an eight-stage pipeline in accordance with the prior art.

Generally, there is provided, an instruction with an instruction repeating function. In one embodiment, the instruction includes a parameter that can be set to add a number of repeating instructions followed by a number of NOP (no-operation) instructions. The instruction addresses the data dependency problem. In one embodiment, the instruction includes source and destination address pointers instead of source and destination registers. The address pointers are updated to the next memory locations by, e.g., incrementing or decrementing the pointers after the instruction is executed. When the instruction is repeated, in accordance with an embodiment, each iteration of the repeated instruction uses the updated address pointers so that the operands and destination are from different memory locations and may be different. The instruction can be very useful in a vector processor, where it is common for instructions to be repeated. The instruction can improve cache management because the cache is given an indication that no new instructions are needed in the pipeline for several cycles. That means that in a multi-thread or multi-issue processor, other threads or other execution units can be given priority for several cycles. Also, the other threads or execution units may be able to use the information of the repeating instruction to optimize their operation. In addition, the processor will likely be able to save additional power during the series of NOPs as compared to a pipeline stall. The advantages are possible because when the instruction is decoded, the processor will know that no new instructions will be required until a number of cycles equal to the pipeline length have elapsed.

In accordance with an embodiment, there is provided, a method for executing instructions in a pipelined processor, the method including: receiving a plurality of instructions in the pipelined processor; and receiving and decoding a first instruction of the plurality of instructions, wherein the first instruction has a first bit field for holding a value for indicating how many times execution of the first instruction is repeated, and wherein the value for indicating how many no operation (NOP) instructions follow a last iteration of the repeated first instruction. The first instruction may include a second bit field for designating a first address pointer for retrieving a first source operand from a first memory location. The first address pointer may have an automatic update capability for automatically moving the address pointer to a next memory location after execution of the first instruction is complete. The first instruction may include a third bit field for designating a second address pointer for retrieving a second source operand from a second memory location, and a fourth bit field for designating a third address pointer for a destination memory location for an operation using the first and second source operands, wherein the second and third address pointers may have an automatic update capability for automatically updating the address pointer to a next memory location following execution of the first instruction. The value in the first bit field may be equal to a number of repeated instructions added to a number of the NOP instructions. The value may equal a total number of pipeline stages in the pipelined processor. The method may further include receiving and decoding a second instruction of the plurality of instructions, wherein the second instruction may follow and may be adjacent to the first instruction in the pipelined processor, wherein a data dependency may exist between the first instruction and the second instruction, and wherein the pipeline may be filled with the repeating instructions and the NOP instructions until the data dependency is resolved. The method may further include using the value in the first bit field to adjust an operation of the pipelined processor.

In accordance with another embodiment, there is provided, a method for executing instructions in a pipelined processor, the method including: receiving and decoding a first instruction of a plurality of instructions; receiving and decoding a second instruction of the plurality of instructions, wherein there is a data dependency between the first and second instructions, wherein a value N in a first bit field of the first instruction corresponds to a number of times the first instruction is repeated and to a number of NOP instructions that follow a last iteration of the repeated first instruction; completing execution of the first instruction according to the value N; and completing execution of the second instruction after completing execution of the first instruction. The first instruction may include a plurality of bit fields for holding a plurality of address pointers for retrieving one or more source operands from memory locations and for designating a destination memory location for a result of an operation using the one or more source operands. The plurality of address pointers may have an automatic update capability to automatically update each of the plurality of address pointers to next memory locations after completing execution of the first instruction. The value N in the first bit field may be equal to a number of times the first instruction is repeated plus a number of the NOP instructions. The value N equals a total number of pipeline stages in the pipelined processor. In another embodiment, the value N may be less than the total number of pipeline stages. Receiving and decoding the second instruction of the plurality of instructions may further include the second instruction following and adjacent to the first instruction in the pipelined processor, and wherein the pipeline is filled with the repeating instructions and the NOP instructions until the data dependency is resolved.

In accordance with yet another embodiment, there is provided, a data processing system including: a pipelined processor, wherein the pipelined processor receives a plurality of instructions to be executed, wherein a first instruction of the plurality of instructions is received and decoded by the pipelined processor, wherein the first instruction has a first bit field for holding a value indicating how many times execution of the first instruction is repeated, and wherein the value of the first bit field for indicating how many no operation (NOP) instructions follow a last iteration of the repeated first instruction. The first instruction may include a plurality of bit fields for holding a plurality of address pointers for retrieving one or more source operands from memory locations and for designating a destination memory location for a result of an operation using the one or more source operands. The plurality of address pointers may have an automatic update capability of automatically updating each of the plurality of address pointers to next memory locations after completing execution of the first instruction. The value N in the first bit field may be equal to a number of times the first instruction is repeated plus a number of the NOP instructions. The value N may equal a total number of pipeline stages in the pipelined processor. In another embodiment, the repeating instruction may be limited to a predetermined number of the pipeline stages. In this case, the value N would be less than the total number of pipeline stages. The pipelined processor may receive a second instruction following and adjacent to the first instruction in the pipelined processor, wherein a data dependency exists between the first instruction and the second instruction, and wherein the pipeline may be filled with the repeating instructions and the NOP instructions until the data dependency is resolved. The 3-bit field for value N may be stored in a hardware register of the pipelined processor core(s) instead of a bit field in an instruction.

FIG. 1 illustrates an example eight-stage pipeline 10 in accordance with the prior art. Pipelining in a data processing system is used to speed up the execution of instructions because it allows multiple instructions to be processed concurrently. Eight-stage pipeline 10 is provided as an example of a relatively long pipeline that may be found in, for example, an ARM processor. Pipeline 10 begins with pipeline stage 12. Pipeline stage 12, labeled FETCH1, is a first of two instruction fetch stages. Note that other pipelines may only have one instruction fetch stage. In pipeline stage 12, an address is sent for a next instruction held in memory, and the instruction is received. In pipeline stage 13, labeled FETCH2, branch prediction takes place. In pipeline stage 14, the instruction is decoded. In pipeline stage 15, the instruction is issued. Shift operations, if needed, are performed in pipeline stage 16. Integer operations, if needed, are performed in pipeline stage 17. In pipeline stage 18, the results are saturated. In pipeline stage 19, results are written back to registers or memory locations. Typically, one pipeline stage requires one cycle to complete. However, more than one cycle may be needed depending on what the instruction requires. Note that pipeline stages 10 are just one example of an instruction pipeline. There are many other examples that may have more, fewer, and/or different pipeline stages.

Figure 2:
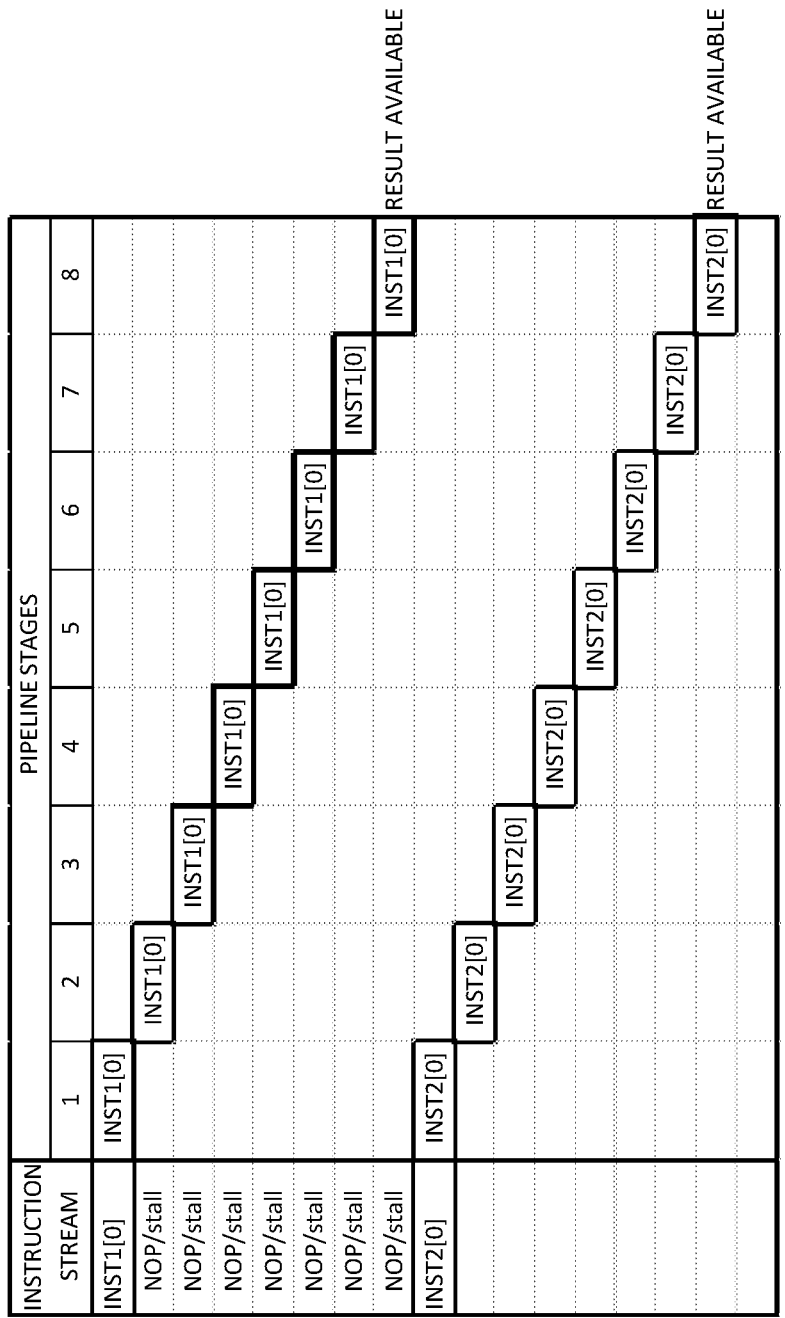
FIG. 2 illustrates two instructions in a processor pipeline to show a pipeline stall due to a data dependency.

FIG. 2 illustrates a diagram of two instructions in a processor pipeline. In FIG. 2, there is a data dependency between the two adjacent instructions labeled INST1[0] and INST2[0]. Instruction INSt1[0] enters the pipeline first. As can be seen in FIG. 2, there are 8 pipeline stages, such as the eight-stage pipeline shown in FIG. 1. An instruction must complete all the pipeline stages before moving on to further processing in, for example, an execution unit of the processor. Instruction INST2[0] is adjacent to and follows instruction INST1[0] in the pipeline. However, a data dependency between instructions INST1[0] and INST2[0] prevents instruction INST2[0] from being propagated to the end of the pipeline until the result is known from instruction INST1[0]. In FIG. 2, the result is known at the end of the eighth stage. This will cause the pipeline to stall and stop executing instructions until the result from instruction INST1[0] is known. Seven hardware stalls or NOPs (no operations) are inserted before instruction INST2[0] is allowed to enter the pipeline, significantly reducing processor throughput.

In many cases, vectors are being processed, so it is possible to replace the first NOP/stall after instruction INST1[0] with a next iteration of instruction INST1[0] as long as the next iteration does not depend on the result of instruction INST1[0]. If seven such operations were available, all the NOP/stalls could be replaced with instructions. However, sometimes, suitable instructions are not available to be inserted in the pipeline.

FIG. 3 illustrates a repeating instruction moving through a processor pipeline in accordance with an embodiment. The repeating instruction is described for a processor that uses address pointers for locations of operands stored in memory instead of using special operand registers. The address pointers are updated automatically each time the instruction is executed. Therefore, each iteration of the repeated instruction operates on different operands even though it is the same instruction.

As discussed above regarding FIG. 2, two adjacent instructions INST1[0] and INST2[0] include a data dependency, where a result in the first instruction INST1[0] is needed by the second instruction INST2[0] before instruction INST2[0] can propagate through the pipeline. Therefore, instruction INST1[0] must finish the pipeline, and the result be available, before instruction INST2[0] can start. However, instead of letting the pipeline stall, as shown in FIG. 2, a repeating instruction can be used. In accordance with an embodiment, the repeating instruction includes a bit field to record a value N including the number of repeated executions of the instruction plus a number of NOP instructions to follow the number of repeated executions, where the number of repeated executions plus the number of NOPs is equal to the pipeline depth. The processor pipeline is an eight-stage processor pipeline as illustrated in FIG. 1. In another embodiment, the pipeline can have any number of stages. As an example, FIG. 3 shows a case where the repeating instruction INST[0] is repeated once, and where a second iteration of the instruction is named INST1[1] and followed by seven NOPs. The second iteration INST1[1]

does not depend on the result of the first iteration INST1[0]. Also, shown is a second iteration INST2[1] of instruction INST2[0]. If instruction INST1[0] could be repeated 8 times without a NOP, then there would be no wasted cycles. However, for illustration purposes, six NOPs are inserted to fill the eight-stage pipeline. Filling the pipeline with NOP instructions or stalls is sometimes referred to as flushing the pipeline. Note that in other embodiments, only a portion of the pipeline may be repeated using the repeating instruction. For example, in the pipeline shown in FIG. 1, only pipeline stages 14-19 may be repeated, making the total number of repeated instructions six instead of the full eight pipeline stages described. In another embodiment, the 3-bit field for value N may be stored in a hardware register of the pipelined processor core(s) instead of a bit field in an instruction.

The use of the repeating instruction is advantageous over allowing the pipeline to stall for multiple cycles. For example, the repeating instruction, as shown, allows cache management to be improved, because the cache can be given notice that no new instructions are needed for several cycles. In a multi-thread or multi-issue processor, other threads or other execution units in the processor can be given priority for several cycles. In addition, the processor state machine will likely be able to save additional power during NOPs as compared to a hardware stall. Also, instruction repeating saves power and instruction fetch bandwidth because the number of instruction memory read cycles is reduced. In addition, in other embodiments, the knowledge of the repeating instruction and the value N may be used to adjust the operation of the pipelined processor when the repeating instruction is encountered. For example, the value N may be used by other threads, execution units, or other fetch units in the pipelined processor to optimize their performance. These benefits are possible because when the repeating instruction is decoded, the processor will know that no new instructions will be required until the number of pipeline stages has elapsed, that is, eight pipeline stages in the example of FIG. 3.

FIG. 4 illustrates an instruction format for a repeating instruction according to an embodiment. The repeating instruction is described for a processor that uses address pointers for locations of operands stored in memory instead of operand registers. The address pointers include an automatic update capability for automatically moving the address pointers to a next memory location after execution of an instruction is complete. The repeating instruction format of FIG. 4 includes 16 bits. Other embodiments may include a different number of bits, such as for example, 32 or 64 bits. Also, the number of bits for various bit fields and the functions and the number of the bit fields may be different in other embodiments. As an example, the instruction illustrated in FIG. 4 is an ADD instruction. The ADD instruction adds two source operands stored at the locations pointed to by the source address pointers and stores the result in a destination in memory pointed to by a destination address pointer. In other embodiments, the instruction may be for a different operation. A bit field labeled OPCODE uses bits 0-3 and is for the opcode of the instruction. The opcode tells the processor what operation to perform, such as an addition (ADD) operation. A bit field labeled N includes bits 4-6 and tells the processor how many times the instruction is repeated plus the number of NOPs following the repeated instructions. A table of values for N is illustrated in FIG. 5. The three bits available to value N can accommodate a pipeline up to eight-stages. More or fewer bits may be needed in other embodiments depending on the number of pipeline stages. The value for N may be determined when a program having the repeating instruction is developed. Bit fields labeled SCR1_PTR and SCR2_PTR include bits 10-12 and bits 7-9, respectively, and are for storing address pointers to source operands stored in memory locations in a memory, such as a cache memory of a data processing system. A bit field labeled DST_PTR includes bits 13-15 and is for storing an address pointer to a destination memory location.

FIG. 5 illustrates a table of values for N and corresponding repeating/NOP behavior for the instruction of FIG. 4. The table is for a pipeline having eight-stages as illustrated above in FIG. 1. Another embodiment for a different pipeline depth will have different values. As can be seen in the table of FIG. 5, each possible value of N for the 3-bit field of FIG. 4 is shown in the left column. The corresponding number of repeated instructions and number of NOPs are shown in the center and right columns, respectively. Note that the number of repeated instructions and the number of NOPs for each value of N equals the number of pipeline stages. As an example, for a value of N equal to 2, the instruction is repeated twice, followed by six NOPs.

Figure 6:
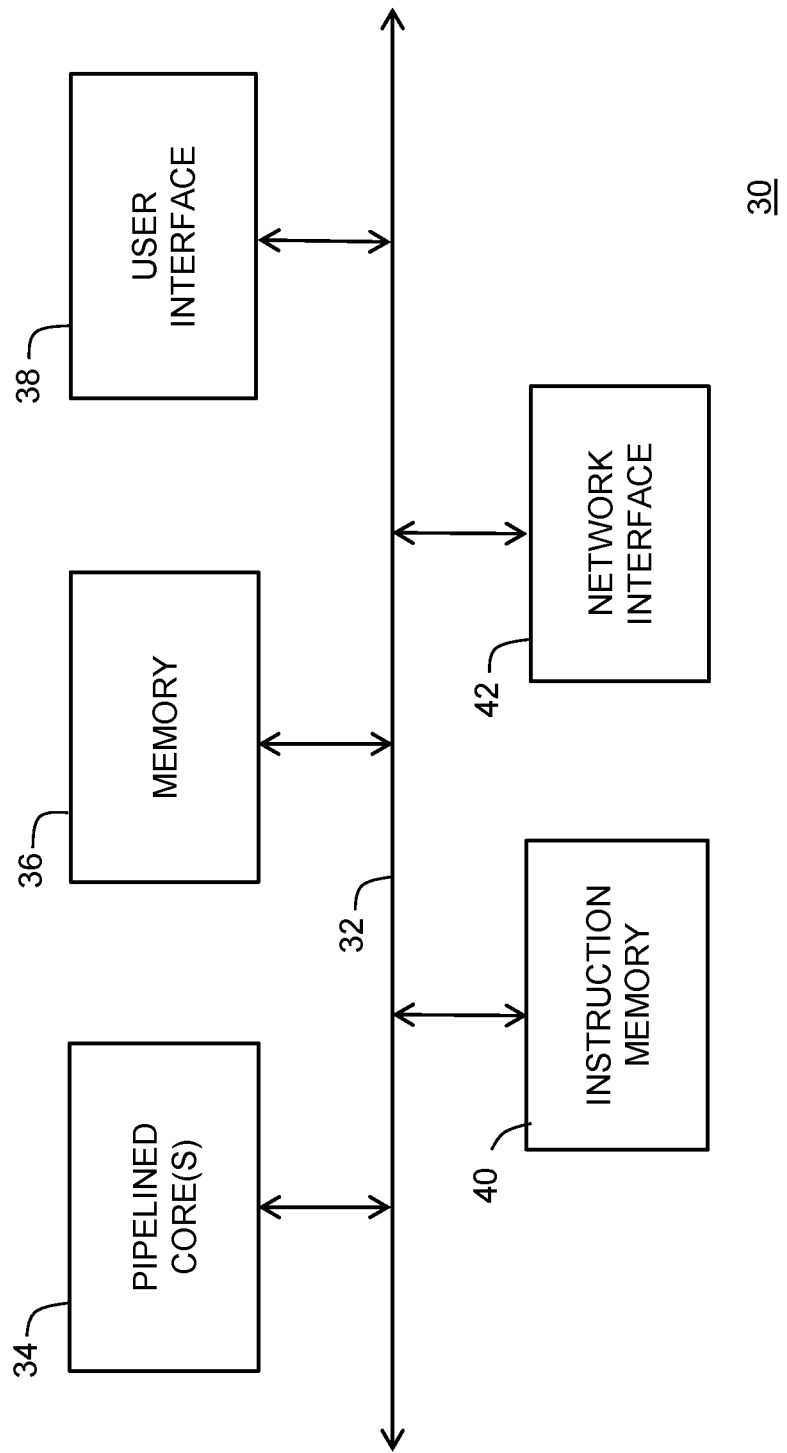
FIG. 6 illustrates a data processing system suitable for implementing the described embodiment.

FIG. 6 illustrates data processing system 30 useful for implementing an embodiment of the present invention. Data processing system 30 may be implemented on one or more integrated circuits and may be used in an implementation of the described embodiments. Data processing system 30 may be optimized for processing vectors. Data processing system 30 includes bus 32. Connected to bus 32 is one or more processor cores 34, memory 36, user interface 38, instruction memory 40, and network interface 42. The one or more processor cores 34 is a pipelined hardware device capable of executing instructions stored in memory 36 or instruction memory 40. The instructions may include instructions having data dependencies between adjacent instructions. Processor cores 34 may include, for example, a microprocessor, a field programmable gate array (FPGA), an application-specific integrated circuit (ASIC), a digital signal processor (DSP), or similar device.

Memory 36 may be any kind of memory, such as for example, L1, L2, or L3 cache or system memory useful for storing the operands and results of execution of the instructions. Memory 36 may include volatile memory such as static random-access memory (SRAM) or dynamic RAM (DRAM), or may include non-volatile memory such as flash memory, read only memory (ROM), or other volatile or non-volatile memory. Alternately, memory 36 may be a hard drive implemented externally to data processing system 30.

User interface 38 may be connected to one or more devices for enabling communication with a user such as an administrator. For example, user interface 38 may be enabled for coupling to a display, a mouse, a keyboard, or other input/output device. Network interface 42 may include one or more devices for enabling communication with other hardware devices. For example, network interface 42 may include, or be coupled to, a network interface card (NIC) configured to communicate according to the Ethernet protocol. Also, network interface 42 may implement a TCP/IP stack for communication according to the TCP/IP protocols. Data samples for classification may be input via network interface 42, or similar interface. Various other hardware or configurations for communicating are available.

Instruction memory 40 may include one or more machine-readable storage media for storing instructions for execution by processor cores 34. In other embodiments, both memories 66 and 70 may store data upon which processor cores 34 may operate.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for executing instructions in a pipelined processor, the method comprising:
   receiving a plurality of instructions in the pipelined processor; and
   receiving and decoding a first instruction of the plurality of instructions, wherein the first instruction has a first bit field for holding a value for indicating how many times execution of the first instruction is repeated, and wherein the value for indicating how many no operation (NOP) instructions follow a last iteration of the repeated first instruction.

2. The method of claim 1, wherein the first instruction includes a second bit field for designating a first address pointer for retrieving a first source operand from a first memory location.

3. The method of claim 2, wherein the first address pointer has an automatic update capability for automatically updating the address pointer to a next memory location after execution of the first instruction is complete.

4. The method of claim 2, wherein the first instruction includes a third bit field for designating a second address pointer for retrieving a second source operand from a second memory location, and a fourth bit field for designating a third address pointer for a destination memory location for an operation using the first and second source operands, wherein the second and third address pointers have an automatic update capability for automatically moving the address pointer to a next memory location following execution of the first instruction.

5. The method of claim 1, wherein the value in the first bit field is equal to a number of repeated instructions added to a number of the NOP instructions.

6. The method of claim 5, wherein the value equals a total number of pipeline stages in the pipelined processor.

7. The method of claim 1, further comprising receiving and decoding a second instruction of the plurality of instructions, wherein the second instruction follows and is adjacent to the first instruction in the pipelined processor, wherein a data dependency exists between the first instruction and the second instruction, and wherein the pipeline is filled with the repeating instructions and the NOP instructions until the data dependency is resolved.

8. The method of claim 1, further comprising using the value in the first bit field to adjust an operation of the pipelined processor.

9. A method for executing instructions in a pipelined processor, the method comprising:
   receiving and decoding a first instruction of a plurality of instructions;
   receiving and decoding a second instruction of the plurality of instructions, wherein there is a data dependency between the first and second instructions, wherein a value N in a first bit field of the first instruction corresponds to a number of times the first instruction is repeated and to a number of NOP instructions that follow a last iteration of the repeated first instruction;
   completing execution of the first instruction according to the value N; and
   completing execution of the second instruction after completing execution of the first instruction.

10. The method of claim 9, wherein the first instruction comprises a plurality of bit fields for holding a plurality of address pointers for retrieving one or more source operands from memory locations and for designating a destination memory location for a result of an operation using the one or more source operands.

11. The method of claim 10, wherein the plurality of address pointers having an automatic update capability to automatically update each of the plurality of address pointers to next memory locations after completing execution of the first instruction.

12. The method of claim 9, wherein the value N in the first bit field is equal to a number of times the first instruction is repeated plus a number of the NOP instructions.

13. The method of claim 12, wherein the value N equals a total number of pipeline stages in the pipelined processor.

14. The method of claim 9, wherein receiving and decoding the second instruction of the plurality of instructions further comprises the second instruction following and adjacent to the first instruction in the pipelined processor, and wherein the pipeline is filled with the repeating instructions and the NOP instructions until the data dependency is resolved.

15. A data processing system comprising:
   a pipelined processor, wherein the pipelined processor receives a plurality of instructions to be executed, wherein a first instruction of the plurality of instructions is received and decoded by the pipelined processor, wherein the first instruction has a first bit field for holding a value indicating how many times execution of the first instruction is repeated, and wherein the value of the first bit field for indicating how many no operation (NOP) instructions follow a last iteration of the repeated first instruction.

16. The data processing system of claim 15, wherein the first instruction comprises a plurality of bit fields for holding a plurality of address pointers for retrieving one or more source operands from memory locations and for designating a destination memory location for a result of an operation using the one or more source operands.

17. The data processing system of claim 16, wherein the plurality of address pointers having an automatic update capability of automatically updating each of the plurality of address pointers to next memory locations after completing execution of the first instruction.

18. The data processing system of claim 15, wherein the value in the first bit field is equal to a number of times the first instruction is repeated plus a number of the NOP instructions.

19. The method of claim 18, wherein the value N equals a total number of pipeline stages in the pipelined processor.

20. The data processing system of claim 19, wherein the pipelined processor receives a second instruction following and adjacent to the first instruction in the pipelined processor, wherein a data dependency exists between the first instruction and the second instruction, and wherein the pipeline is filled with the repeating instructions and the NOP instructions until the data dependency is resolved.

21. The data processing system of claim 15, wherein the value in the first bit field is stored in a hardware register the pipelined processor instead of a bit field of the instruction.

* * * * *